(12) United States Patent
Su

(10) Patent No.: US 8,755,514 B1
(45) Date of Patent: Jun. 17, 2014

(54) DUAL-TONE MULTI-FREQUENCY SIGNAL CLASSIFICATION

(71) Applicant: The United States of America as represented by the Secretary of the Army, Washington, DC (US)

(72) Inventor: Wei Su, Bel Air, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 14/027,680

(22) Filed: Sep. 16, 2013

(51) Int. Cl.
*H04M 3/00* (2006.01)
*H04M 1/00* (2006.01)

(52) U.S. Cl.
USPC .......................................... 379/283; 379/386

(58) Field of Classification Search
CPC ............. H04Q 1/30; H04Q 1/45; H04Q 1/46; H04Q 1/457; H04Q 1/4575; H04M 7/125; H04M 7/1295
USPC ............ 379/142.18, 282, 283, 284, 285, 286, 379/372, 386
See application file for complete search history.

(56) References Cited

U.S. PATENT DOCUMENTS

| | | | | |
|---|---|---|---|---|
| 4,563,548 A | * | 1/1986 | Misherghi et al. | 379/357.04 |
| 5,353,346 A | * | 10/1994 | Cox et al. | 379/386 |
| 5,793,862 A | * | 8/1998 | Sato et al. | 379/386 |
| 6,078,660 A | * | 6/2000 | Burgess | 379/386 |
| 6,728,369 B2 | * | 4/2004 | Burgess | 379/386 |
| 6,782,095 B1 | * | 8/2004 | Leong et al. | 379/386 |
| 7,133,521 B2 | * | 11/2006 | Jabri et al. | 379/386 |
| 7,428,270 B1 | * | 9/2008 | Dubuc et al. | 375/316 |
| 2003/0123643 A1 | * | 7/2003 | Burgess | 379/352 |
| 2004/0174984 A1 | * | 9/2004 | Jabri et al. | 379/386 |
| 2010/0322178 A1 | | 12/2010 | Li et al. | |
| 2012/0095760 A1 | * | 4/2012 | Ojala | 704/228 |
| 2013/0117029 A1 | | 5/2013 | Liu et al. | |

* cited by examiner

*Primary Examiner* — Binh Tieu
(74) *Attorney, Agent, or Firm* — Azza Jayaprakash

(57) ABSTRACT

Various embodiments associated with signal classification are described. A repeating signal can be partially corrupted and therefore a receiver can obtain an incomplete signal. In one example, the incomplete signal can have discontinuous unobstructed segments. In order for the receiver to understand the contents of the signal, the receiver can identify repeated information in the discontinuous unobstructed segments. This repeated information can be processed to determine content of the signal. In one embodiment, the signal is a dual-tone multi-frequency (DTMF) signal. The receiver can process the content of the DTMF, such as by employing a set of high and low band pass filters, and can identify a high and low frequency of the DTMF. With the high and low frequencies identified, the receiver can access a look-up table and identify a character indicated by the high and low frequency. The receiver can then use or send out the identified character.

20 Claims, 19 Drawing Sheets

US 8,755,514 B1

DUAL-TONE MULTI-FREQUENCY SIGNAL CLASSIFICATION

GOVERNMENT INTEREST

The innovation described herein may be manufactured, used, imported, sold, and licensed by or for the Government of the United States of America without the payment of any royalty thereon or therefore.

BACKGROUND

A transmitter can send out a communication signal. A receiver that receives the communication signal, whether the receiver is a receiver intended by the transmitter or not, can attempt to process the communication signal. However, if at least some information about the communication signal is not known to the receiver, then processing the communication signal can be difficult and ultimately it can be difficult to use the content of the communication signal.

SUMMARY

A system is disclosed comprising a high frequency identification component configured to identify a high frequency of a dual-tone multi-frequency signal. The system also comprises a low frequency identification component configured to identify a low frequency of the dual-tone multi-frequency signal. The system further comprises a classification component configured to determine a classification of the dual-tone multi-frequency signal based, at least in part, on the high frequency and a low frequency. In addition, the system comprises a non-transitory computer-readable medium configured to retain an information set that pertains to operation of the high frequency identification component, the low frequency identification component, the classification component, or a combination thereof.

A system is disclosed comprising a high frequency identification component configured to identify and rank, by likelihood, potential high frequency values of a dual-tone multi-frequency signal. The system also comprises a low frequency identification component configured to identify and rank, by likelihood, potential low frequency values of the dual-tone multi-frequency signal. In addition, the system comprises a classification component configured to produce a classification scheme of the dual-tone multi-frequency signal based, at least in part, on ranks of the potential high frequency values and based, at least in part, on ranks of the potential low frequency values. Further, the system comprises a processor configured to execute at least one instruction that pertains to operation of the high frequency identification component, the low frequency identification component, the classification component, or a combination thereof.

A system comprising a processor and a non-transitory computer-readable medium configured to store processor-executable instructions that when executed by a processor cause the processor to perform a method is described. The method comprises identifying unobstructed segments of a dual-tone multi-frequency signal, where the unobstructed segments are discontinuous from one another. In addition, the method comprises identifying a high frequency of the dual-tone multi-frequency signal through use of the unobstructed segments. Also, the method comprises identifying a low frequency of the dual-tone multi-frequency signal through use of the unobstructed segments. The method additionally comprises determining a classification of the dual-tone multi-frequency signal based, at least in part, on the high frequency and a low frequency.

BRIEF DESCRIPTION OF THE DRAWINGS

Incorporated herein are drawings that constitute a part of the specification and illustrate embodiments of the detailed description. The detailed description will now be described further with reference to the accompanying drawings as follows:

FIG. 15A illustrates one embodiment of a first graph of a signal while

FIG. 17A illustrates one embodiment of a first processing result set while

DETAILED DESCRIPTION

Figure 1:
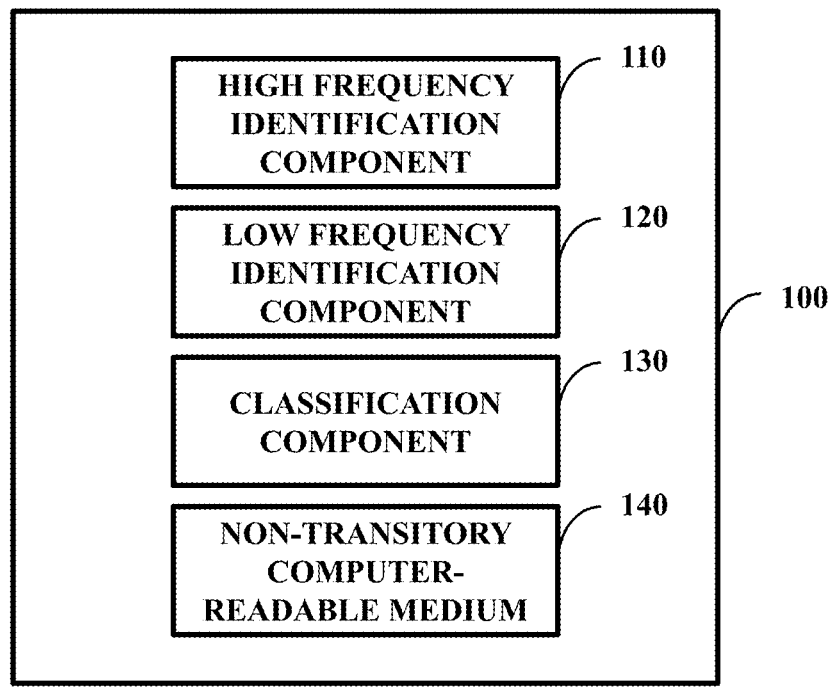
FIG. 1 illustrates one embodiment of a system comprising a high frequency identification component, a low frequency identification component, a classification component, and a non-transitory computer-readable medium.

A repeating signal can be partially corrupted and therefore a receiver, that comprises hardware, can obtain an incomplete signal. In one example, the incomplete signal can have discontinuous unobstructed segments. In order for the receiver to understand the type of the signal, the receiver can identify repeated information in the discontinuous unobstructed segments. This repeated information can be processed to determine the type of the signal.

In one embodiment, the signal is a dual-tone multi-frequency (DTMF) signal. The receiver can process the content of the DTMF, such as by employing a set of high and low band pass filters, and can identify a high and low frequency of the DTMF. With the high and low frequencies identified, the receiver can access a look-up table and identify a character indicated by the high and low frequency. The receiver can then use or send out the identified character.

Aspects disclosed herein can be used in decoding the DTMF signal. A DTMF signal can be used in telephone signaling over a telephone line or other medium in a voice-frequency band to a call switching center, for signaling internal to a telephone network, for cable television broadcasters to indicate start and stop times of local commercial insertion points during station breaks for the benefit of cable companies, and other applications.

A DTMF signal can be decoded by a Goertzel algorithm and some DTMF receivers can reliably detect DTMF as short as 45 milliseconds for continuous signal. However, when the signal transmitted in a strong fading or interfering environment, the signal propagation is subjected to periodic obstructions. As a result, only a few discontinuous segments of the signal, each of a length, such as, and spaced seconds apart, are usable at the receiver. When the time interval of the signal segment is much shorter than 45 milliseconds, the DTMF tones may not be able to be decoded through use of the Goertzel algorithm and therefore other aspects can be practiced to recover the DTMF from the non-continuous signal segments.

A DTMF signal x(t) can be described as $$x(t)=a \cos(2\pi ut+\Phi)+b \cos(2\pi vt+\phi) \quad (1)$$

where u is the low frequency chosen from: 697 Hz, 770 Hz, 852 Hz, and 941 Hz, and v is the high frequency chosen from: 1209 Hz, 1336 Hz, 1477 Hz, and 1633 Hz, a and b are amplitudes, and $\Phi$ and $\phi$ are initial phases.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single logical component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

FIG. 1 illustrates one embodiment of a system 100 comprising a high frequency identification component 110, a low frequency identification component 120, a classification component 130, and a non-transitory computer-readable medium 140. The high frequency identification component 110 can be configured to identify a high frequency of the DTMF signal. The low frequency identification component 120 can be configured to identify a low frequency of the DTMF signal. The classification component 130 is configured to determine a classification of the DTMF signal based, at least in part, on the high frequency and a low frequency. The non-transitory computer-readable medium 140 can be configured to retain an information set (e.g., processor executable instruction, look-up table, etc.) that pertains to operation of the high frequency identification component 110, the low frequency identification component 120, the classification component 130, at least one other component disclosed herein, or a combination thereof.

In one embodiment, the DTMF signal comprises a higher bandwidth and a lower bandwidth. The high frequency identification component 110 can comprises a band pass filter at the higher bandwidth. Likewise, the low frequency identification component 120 can comprise a band pass filter at the lower bandwidth. The band pass filter can be software filters that employ mathematical equations to operate and/or can be hardware filters that employ hardware parts to operate.

In one embodiment, the DTMF has two frequencies, the high frequency and the low frequency. The classification can be determined from these frequencies and the classification can correspond to a character of a keypad. In one example, the classification component 130 can employ a look-up table to determine the classification.

In one example, sixteen potential characters exist for the DTMF: 0-9, A-D, *, and #. Individual potential characters can correspond to different high and low frequencies and these frequencies can be identified by the following example look-up table:

| Key | Low Frequency (in Hz) | High Frequency (in Hz) |
|---|---|---|
| 1 | 697 | 1209 |
| 4 | 770 | 1209 |
| 7 | 852 | 1209 |
| * | 941 | 1209 |
| 2 | 697 | 1336 |
| 5 | 770 | 1336 |
| 8 | 852 | 1336 |
| 0 | 941 | 1336 |
| 3 | 697 | 1477 |
| 6 | 770 | 1477 |
| 9 | 852 | 1477 |
| # | 941 | 1477 |
| A | 697 | 1633 |
| B | 770 | 1633 |
| C | 852 | 1633 |
| D | 941 | 1633 |

In one example of use of this example look-up table, the classification component 130 can take the high frequency and low frequency and find the key, where the key can be the classification. For example, the low frequency identification component 110 can identify the low frequency as 697 Hz while the high frequency identification component 120 can identify the high frequency as 1633 Hz. Based on these two frequencies, the classification component 130 can determine that the DTMF signal is signifying a character of 'A' and send an output that the character is 'A.'

In one example, the low frequency and high frequency do not match up directly with values of the example look-up table. In one example, the low frequency can be 772 Hz and the high frequency can be 1625 Hz. Since these two frequencies are relatively close to 770 Hz and 1633 Hz, the classification component 130 can determine that the DTMF signal is signifying a character of 'B.'

In one example, the low frequency and high frequency do not match up directly with values of the example look-up table and are less close to actual values. For example the low frequency can be 900 Hz and the high frequency can be 1631 Hz. The classification component 130 can determine that the classification is two potential classifications 'C' since 900 Hz is relatively close to 852 Hz and 'D' since 900 Hz is relatively close to 941 Hz yet neither 852 Hz nor 941 Hz are particularly close to 900 Hz. With this situation, the classification can comprise two outcomes, 'C' and 'D.' As part of the classification, the classification component 130 can include likelihood percentages on how likely 'C' and 'D' are to being correct such as 'C' having a higher percentage than 'D' since 941 Hz is closer to 900 Hz then 852 Hz is to 900 Hz. These likelihood percentages can be outputted as part of the classification. While this example shows that the low frequency is not particularly close to an actual value one of ordinary skill in the art will appreciate that the high frequency can also not be particularly close independent of closeness of the low frequency (e.g. just the high frequency is not particularly close or both the high and low frequencies are not particularly close).

Figure 2:
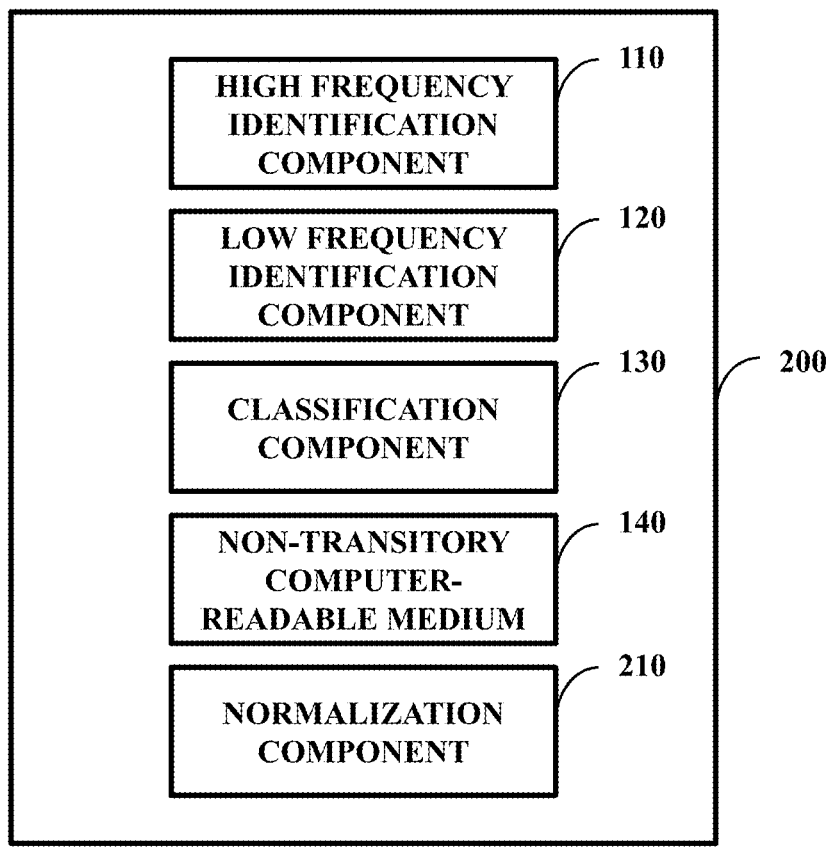
FIG. 2 illustrates one embodiment of a system comprising the high frequency identification component, the low frequency identification component, the classification component, the non-transitory computer-readable medium, and a normalization component.

FIG. 2 illustrates one embodiment of a system 200 comprising the high frequency identification component 110, the low frequency identification component 120, the classification component 130, the non-transitory computer-readable medium 140, and a normalization component 210. The normalization component 210 can be configured to normalize the DTMF signal, where the high frequency identification component 110 and the low frequency identification component 120 use the normalized version of the DTMF signal to perform their identifications. In one embodiment, the DTMF signal can be normalized (e.g., by the normalization component 210 of FIG. 2) to maximum amplitude or average amplitude. In addition to normalization, other signal processing can occur before or after the high frequency identification component 110 and/or the low frequency identification component 120 operate.

Figure 3:
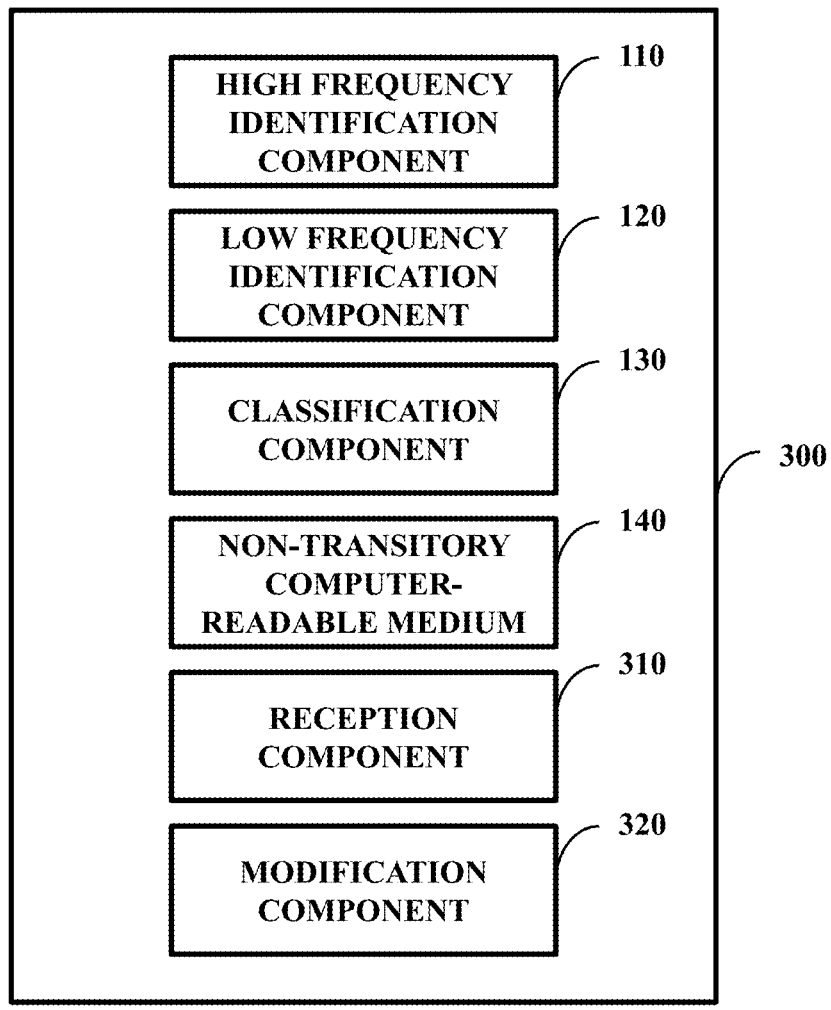
FIG. 3 illustrates one embodiment of a system comprising the high frequency identification component, the low frequency identification component, the classification component, the non-transitory computer-readable medium, a reception component, and a modification component.

FIG. 3 illustrates one embodiment of a system 300 comprising the high frequency identification component 110, the low frequency identification component 120, the classification component 130, the non-transitory computer-readable medium 140, a reception component 310, and a modification component 320. The reception component 310 can be configured to receive the DTMF signal. The modification component 320 can be configured to zero the obstructed portion. The high frequency identification component 110 can be configured to identify the high frequency of the DTMF signal through use of the unobstructed portion. In addition, the low frequency identification component 120 is configured to identify the low frequency of the DTMF signal through use of the unobstructed portion.

The DTMF signal received by the reception component 310 can have an obstructed portion and an unobstructed portion. The unobstructed portion can comprise a first signal segment and a second signal segment that are discontinuous. The content of the second signal segment can be coherent to content of the first signal segment.

Figure 4:
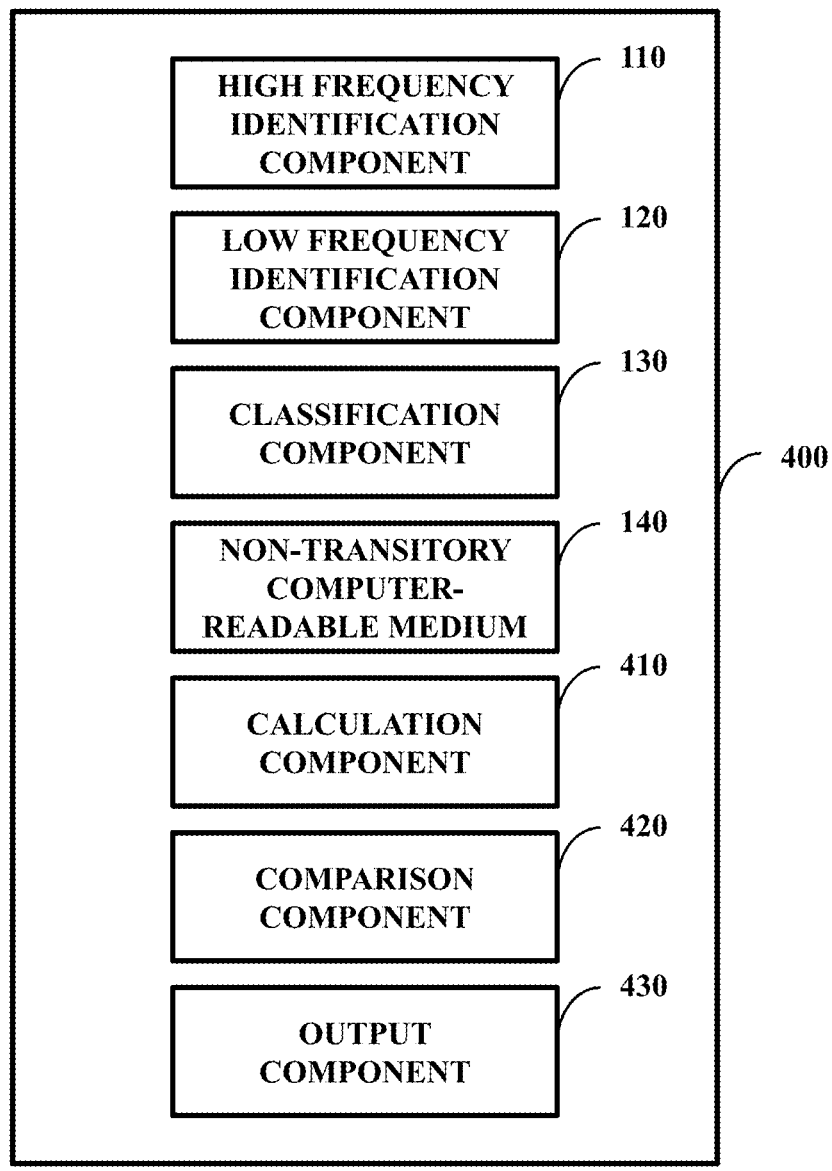
FIG. 4 illustrates one embodiment of a system comprising the high frequency identification component, the low frequency identification component, the classification component, the non-transitory computer-readable medium, a calculation component, a comparison component, and an output component.

FIG. 4 illustrates one embodiment of a system 400 comprising the high frequency identification component 110, the low frequency identification component 120, the classification component 130, the non-transitory computer-readable medium 140, a calculation component 410, a comparison component 420, and an output component 430. The calculation component 410 can be configured to calculate a confidence level of the classification. The comparison component 420 can be configured to compare the confidence level against a threshold to produce a comparison result. The output component 430 can be configured to output the classification if the comparison result is such that the confidence level meets the threshold. The output component 430 can also be configured to output an error message if the comparison result is such that the confidence level does not meet the threshold.

Due to various factors, such as interference and the quality of unobstructed segments of the DTMF signal, the classification may be difficult to determine. Thus, the confidence of the classification may also be relatively low. When the confidence is relatively low a device that uses the classification could potentially function with incorrect information. Therefore, the system 400 can function such that the classification is outputted (e.g., made available to the device, sent to the device, etc.) when the threshold is met (e.g., threshold reached, threshold exceeded, etc.). When the threshold is not met an error message can be emitted (e.g., a request sent to a transmitter to resend the DTMF signal, a notice to the device that the classification is unknown, etc.).

Figure 5:
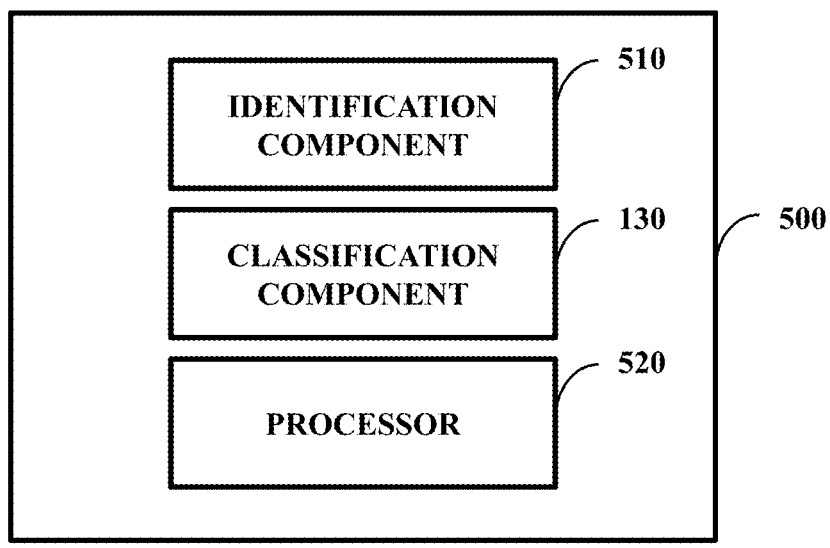
FIG. 5 illustrates one embodiment of a system comprising an identification component, a classification component, and a processor.

FIG. 5 illustrates one embodiment of a system 500 comprising an identification component 510, a classification component 130, and a processor 520. The identification component 510 can comprise the high frequency identification component 110 of FIG. 1 and the low frequency identification component 120 of FIG. 1. The high frequency identification component that is part of the identification component 510 can be configured to identify and rank, by likelihood, potential high frequency values of a DTMF signal. The low frequency identification component that is part of the identification component 520 can be configured to identify and rank, by likelihood, potential low frequency values of the DTMF signal. The classification component 130 can be configured to produce a classification scheme of the DTMF signal based, at least in part, on ranks of the potential high frequency values and based, at least in part, on ranks of the potential low frequency values. The processor 520 can configured to execute at least one instruction that pertains to operation of the high frequency identification component that is part of the identification component 520, the low frequency identification component that is part of the identification component 520, the classification component 130, or a combination thereof.

Returning to the example above with the discussion of FIG. 1, the look-up table can be used to identify content of the DTMF signal. As discussed, the high frequency and/or the low frequency can fall in between two frequencies of the look-up table. The identification component 520 can rank the likelihood of low candidate frequencies of the look-up table (697 Hz, 770 Hz, 852 Hz, and 941 Hz) and high candidate frequencies of the look-up table (1209 Hz, 1336 Hz, 1477 Hz, and 1633 Hz). Based on these ranks the classification scheme can be determined and outputted.

In one example, the low frequency can be 940 Hz and the high frequency can be 1420 Hz. The identification component 510 can evaluate the low frequency and the high frequency against the look-up table. Based on this the identification component 510 can rank (e.g., place in order, assign likelihood percentages, etc.) the low frequency and the high frequency. In this example, since the low frequency is almost equal to 941 Hz, the identification component 510 can order 940 Hz first with a high likelihood and 852 Hz, 770 Hz, and 697 Hz can be ranked as second, third and fourth respectively with the low likelihoods. Since the high frequency is closer to 1477 Hz than 1336 Hz, then 1477 Hz can be ranked first, with 1336 Hz being ranked second, 1209 Hz third, and 1633 Hz fourth. However, since the high frequency is not extremely close to 1336 Hz or 1477 Hz likelihood percentages of x % and y % can be assigned to 1336 Hz and 1477 Hz respectively. These likelihood percentages are numbers less than about 100%, but greater than 0%. The reason y % is greater than x % is because 1420 Hz is closer to 1477 Hz than 1336 Hz. The classification component 130 can access this information and determine the classification scheme from this information. In one example, the classification scheme can be such that '#' is a most likely character since the greatest percentages are for 941 Hz and 1477 Hz and that '0' is also a likely character since 941 Hz and 1336 Hz have high percentages. These characters can also be given percentages of likelihood (e.g., y % and x % since they share the same low frequency). The classification scheme can include the most likely character, characters that have likelihoods that meet a threshold, a set number of characters, characters with a likelihood greater than about 0%, etc. The classification component 130 can output the classification scheme to the device.

Figure 6:
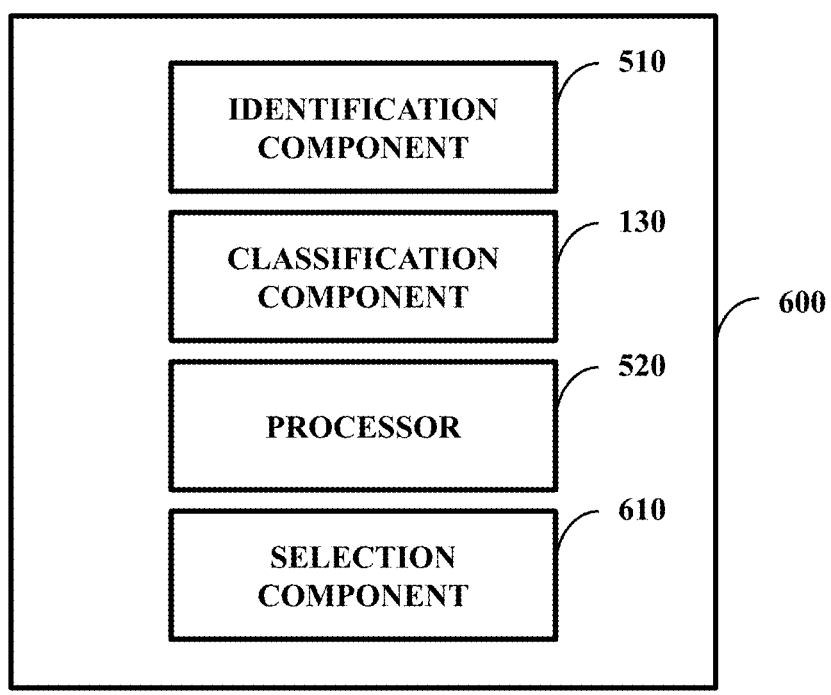
FIG. 6 illustrates one embodiment of a system comprising the identification component, the classification component, the processor, and a selection component.

FIG. 6 illustrates one embodiment of a system 600 comprising the identification component 510, the classification component 130, the processor 520, and a selection component 610. The selection component 610 can be configured to select a highest rank set of the potential high frequency values that is less than the full set of potential high frequency values and configured to select a highest rank set of the potential low frequency values that is less than the full set of potential low frequency values. The classification scheme comprises likelihood of combinations based from individual members of the highest rank set of the potential high frequency values and the highest rank set of the potential low frequency values. In addition, the classification scheme can comprise the values of frequency combinations themselves (e.g., low of 697 Hz and high of 1209 Hz) and/or characters represented by such characterizations (e.g., the value '1').

Returning to the example where the low frequency can be 940 Hz and the high frequency can be 1420 Hz. The selection component 610 can select 941 Hz for the low frequency and 1477 Hz and 1336 Hz for the high frequencies. From what the selection component 610 selects, the classification component 130 can produce the classification scheme that comprises '#' with x % and '0' with y % and as such the classification scheme comprises likelihoods.

Figure 7:
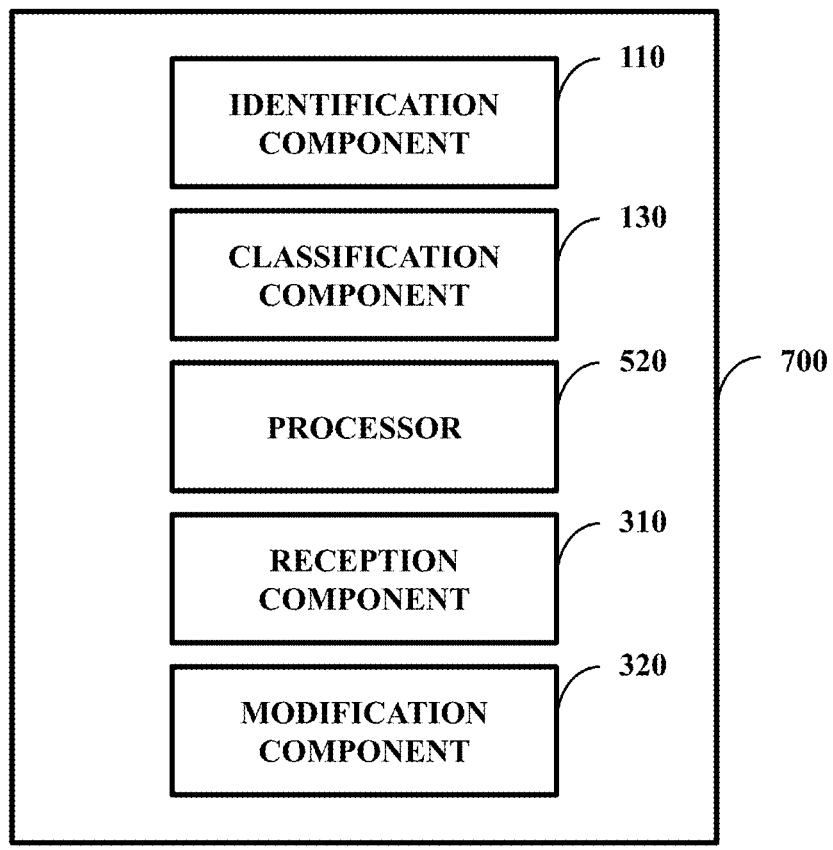
FIG. 7 illustrates one embodiment of a system comprising the identification component, the classification component, the processor, the reception component, and the modification component.

FIG. 7 illustrates one embodiment of a system 700 comprising the identification component 510, the classification component 130, the processor 520, the reception component 310, and the modification component 320. The reception component 310 can be configured to receive the DTMF signal, where the DTMF signal that is received has an obstructed portion and an unobstructed portion. The modification component 320 can be configured to zero the obstructed portion. The high frequency identification component that is part of the identification component 510 can be configured to identify the high frequency of the DTMF signal through use of the unobstructed portion. Additionally, the low frequency identification component that is part of the identification component 510 can be configured to identify the low frequency of the DTMF signal through use of the unobstructed portion.

In one embodiment, the unobstructed portion comprises a first signal segment and a second signal segment. In one embodiment, the first signal segment and the second signal segment are discontinuous. In one embodiment, content of the second signal segment is at least partially repetitive of content of the first signal segment.

Figure 8:
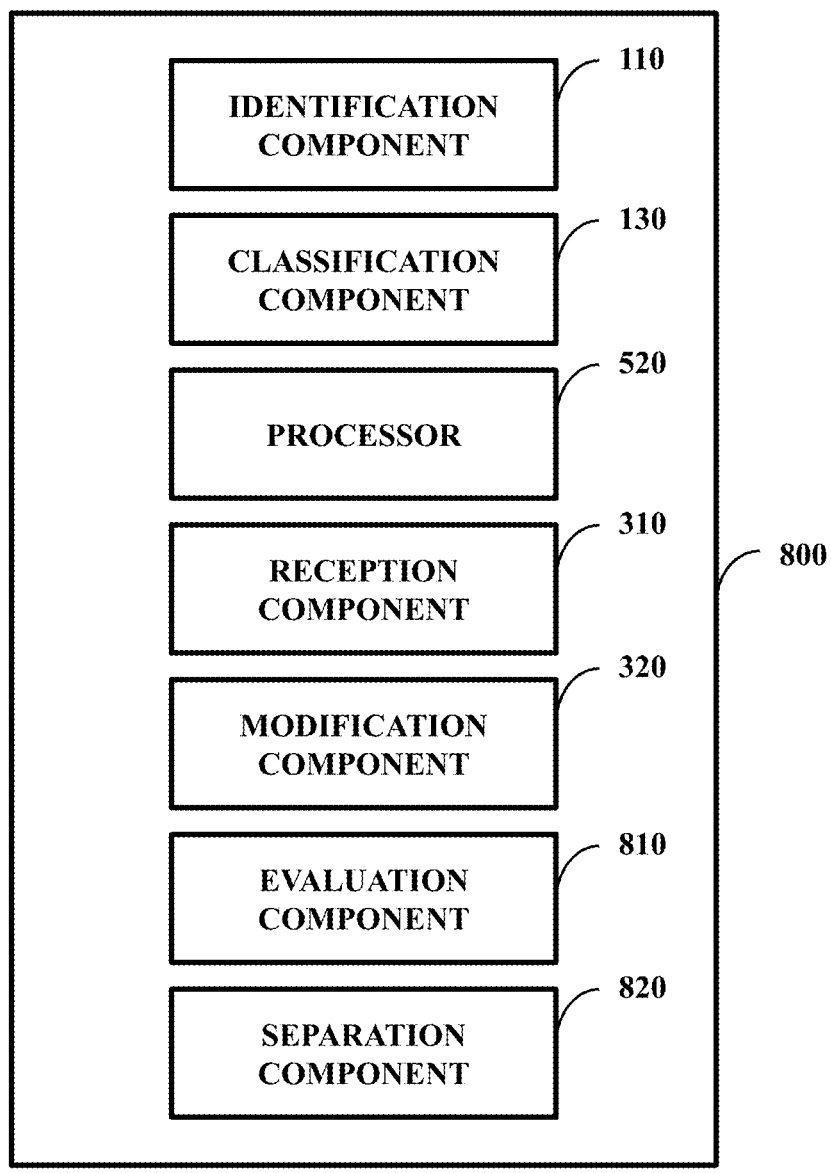
FIG. 8 illustrates one embodiment of a system comprising the identification component, the classification component, the processor, the reception component, the modification component, an evaluation component, and a separation component.

FIG. 8 illustrates one embodiment of a system 800 comprising the identification component 510, the classification component 130, the processor 520, the reception component 310, the modification component 320, an evaluation component 810, and a separation component 820. The evaluation component 810 can be configured to evaluate the DTMF signal after reception to produce an evaluation result. The separation component 820 can be configured to separate the obstructed portion (e.g., segments that are substantially distorted such that they are not usable) from the unobstructed portion (e.g., segments that are not so distorted and as such are usable), where the modification component 320 functions after this separation.

In one embodiment, the DTMF signal includes a higher bandwidth and a lower bandwidth. The high frequency identification component that is part of the identification component 520 can comprise at least four high frequency filters corresponding to at least four potential high frequencies. In one example, the high frequency filters can be a 1209 Hz filter, a 1336 Hz filter, a 1477 Hz filter, and a 1633 Hz filter. The low frequency identification component comprises at least four low frequency filters corresponding to at least four potential low frequencies. In one example, the low frequency can be a 697 Hz filter, a 770 Hz filter, a 852 Hz filter, and a 941 Hz filter. The identification component 520 can employ these eight filters in identifying frequencies of the DTMF signal.

Figure 9:
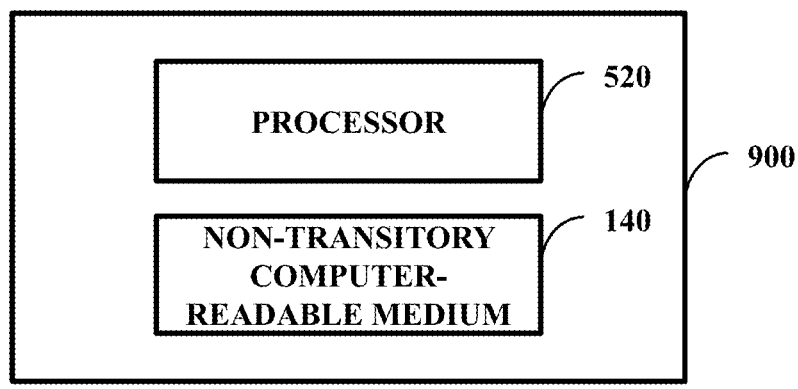
FIG. 9 illustrates one embodiment of a system comprising the processor and the non-transitory computer-readable medium.

FIG. 9 illustrates one embodiment of a system 900 comprising the processor 520 and the non-transitory computer-readable medium 140. In one embodiment the non-transitory computer-readable medium 140 is configured to store computer-executable instructions that when executed by the processor 520 cause the processor 520 to perform a method disclosed herein (e.g., the method 1000 discussed in the next paragraph). In one embodiment the non-transitory computer-readable medium 140 is communicatively coupled to the processor 520 and stores a processor executable command set to facilitate operation of at least one component disclosed herein.

Figure 10:
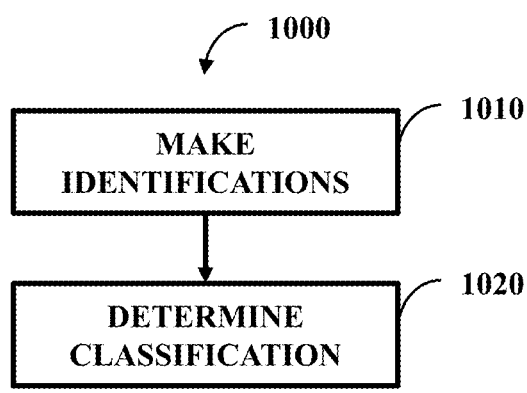
FIG. 10 illustrates one embodiment of a method comprising two actions.

FIG. 10 illustrates one embodiment of a method 1000 comprising two actions 1010 and 1020. At 1010 there can be identifying unobstructed segments of a DTMF signal, where the unobstructed segments are discontinuous from one another. At 1010 there can also be identifying a high frequency of the DTMF signal through use of the unobstructed segments that are identified. Also at 1010 there can be identifying a low frequency of the DTMF signal through use of the unobstructed segments. At 1020 there can be determining a classification communicated by the DTMF signal based, at least in part, on the high frequency and a low frequency.

Figure 11:
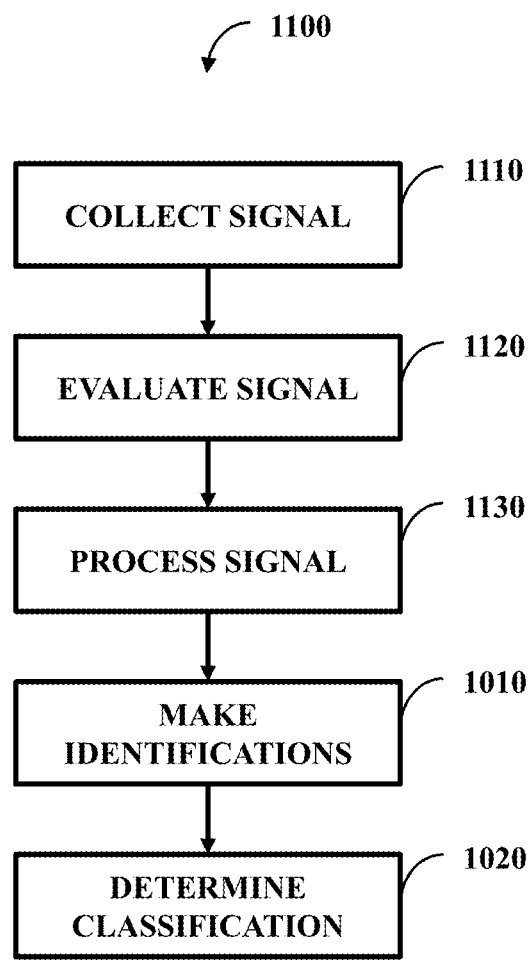
FIG. 11 illustrates one embodiment of a method comprising five actions.

FIG. 11 illustrates one embodiment of a method 1100 comprising five actions 1110, 1120, 1130, 1010, and 1020. At 1110 the DTMF signal can be collected, where the DTMF signal that is collected has an obstructed portion and an unobstructed portion. The unobstructed portion can comprise the unobstructed segments. At 1120 there can be evaluating the DTMF signal after collection to produce an evaluation result, where the evaluation result is used in identifying the unobstructed segments of the DTMF signal. At 1130 various signal processing can occur, such as zeroing the obstructed portion, where identification of the high frequency and low frequency occurs after zeroing the obstructed portions. The signal processing at 1130 can include normalizing the DTMF signal, where identification of the high frequency and low frequency occurs after normalizing the DTMF signal. Once the signal is processed identifications can be made at 1010 and the classification can be determined at 1020.

Figure 12:
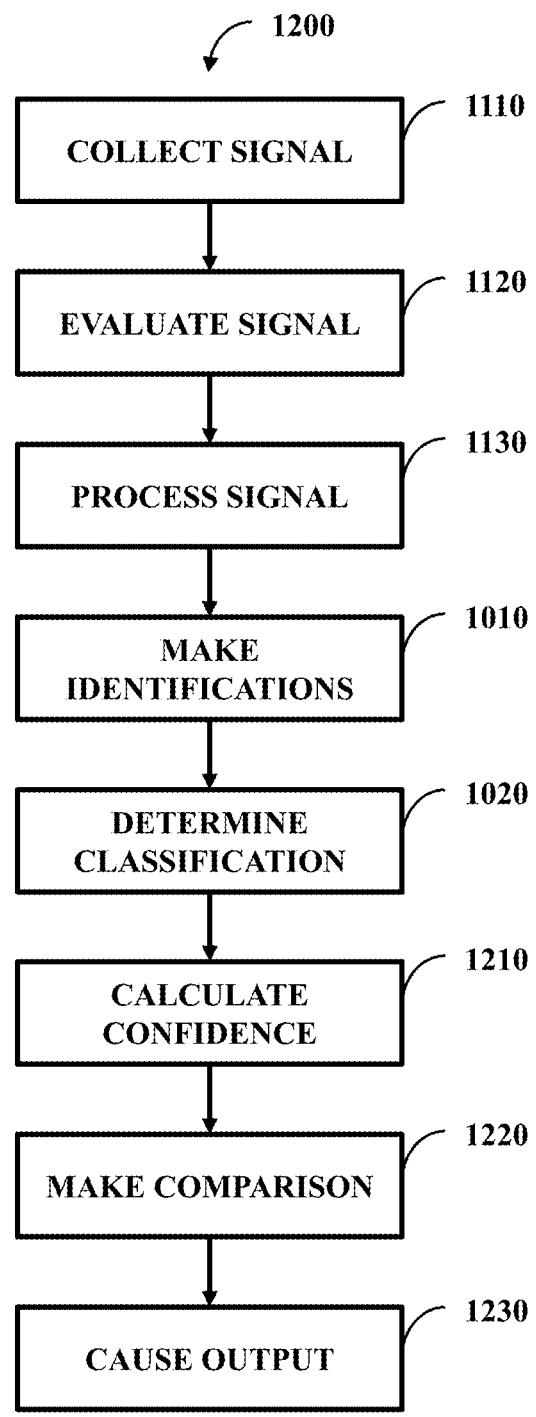
FIG. 12 illustrates one embodiment of a method comprising eight actions.

FIG. 12 illustrates one embodiment of a method 1200 comprising eight actions 1110-1130, 1010, 1020, 1210, 1220, and 1230. After the signal is collected at 1110, evaluated at 1120, and processed at 1130, identifications can be made at 1010, and the classification can be determined at 1020. At 1210 there is calculating a confidence level of the classification while at 1220 there is comparing the confidence level against a threshold to produce a comparison result. At 1230 there is causing output indicative of the character if the comparison result is such that the confidence level meets the threshold as well as causing output of an error message if the comparison result is such that the confidence level does not meet the threshold.

In one embodiment, the unobstructed segments comprise a first signal segment and a second signal segment. Content of the second signal segment can be coherent to the content of the first signal segment. The classification can correspond to a character of a keypad and the output indicative of the classification can comprise an indicator of the character of the keypad to which the classification corresponds.

Figure 13:
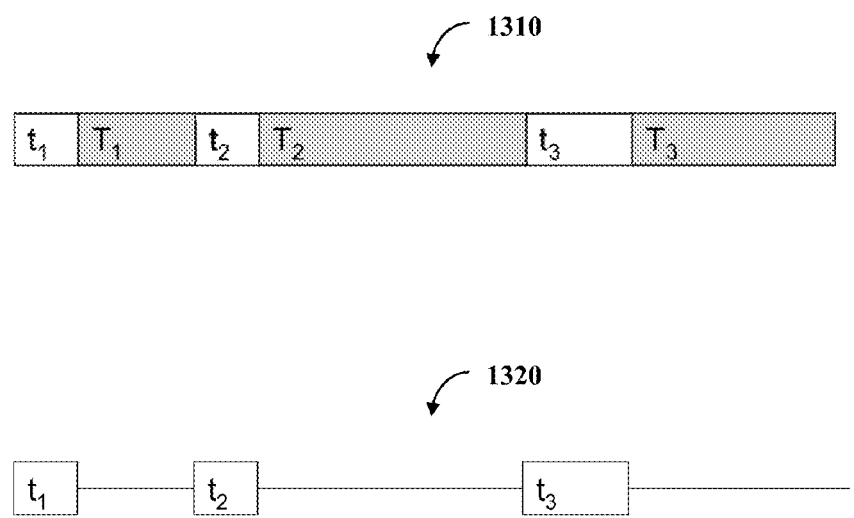
FIG. 13 illustrates one embodiment of a complete signal and a signal with selected portions.

FIG. 13 illustrates one embodiment of a complete signal 1310 and a signal with selected portions 1320. The complete signal 1310 can be an example DTMF signal that can be used in aspects disclosed herein, such as be the signal processed by the method 1200 of FIG. 12. In one embodiment, the DTMF signal x(t) has relatively few good quality signal segments (unobstructed (e.g. not obstructed, limited obstruction yet still usable, etc.) signal segments), denoted by $t_i$ with i as the integer index, and these good quality segments are separated by the bad (obstructed) segments, denoted by $T_t$, as shown in the complete signal 1310. This shows that the good segments are discontinuous but coherent in time. Thus, the unobstructed portion can comprise a first signal segment and a second signal segment that are discontinuous and content of the second signal segment can be at least partially repetitive of content of the first signal segment.

When $t_i$ is relatively small, it may be difficult to observe the multiple frequencies of the signal from the $i^{th}$ signal segment so that the DTMF signal may have difficulty being decoded. With this situation, when length of x(t) is sufficiently long such that the frequency feature repeats in a late good segment due to the periodic property of the DTMF signal aspects disclosed herein can be used to decode (identify at least some content) the DTMF signal. To decode x(t), the obstructed segments can be replaced with zero amplitudes (e.g., by the normalization component 210 of FIG. 2) and band pass filtering can be applied to x(t), such as by the identification component 510 of FIG. 5, and convolutions can be computed as follows:

$$y_L(t) = \frac{2}{\tau} \int_0^\tau x(\lambda)(r_i^L(t-\lambda)) d\lambda \qquad (2)$$

and $$y_H(t) = \frac{2}{\tau} \int_0^\tau x(\lambda)(r_j^H(t-\lambda)) d\lambda \qquad (3)$$

where $\tau$ is the integration interval which is usually not less than $$\frac{1}{697}$$

second, and $$r_i^L(t) = \cos(2\pi f_i^L t) \qquad (4)$$

$$r_j^H(t) = \cos(2\pi f_j^H t) \qquad (5)$$

and where i=1, 2, 3, 4 are the indices for lower candidate frequencies: $f_1^L$=697 Hz, $f_2^L$=770 Hz, $f_3^L$=852 Hz, and $f_4^L$=941 Hz, and j=1, 2, 3, 4 are the indices for higher candidate frequencies: $f_1^H$=1209 Hz, $f_2^H$=1336 Hz, $f_3^H$=1477 Hz and $f_4^H$1633 Hz. The convolutions in EQ.2 can serve as four filters for the lower frequencies and an individual filter can be designed to enhance one assigned lower frequency but eliminate other three frequencies. The convolutions in EQ.3 can serve as four filters for the higher frequencies and an individual filter can be designed to enhance one assigned higher frequency but eliminate the other three frequencies. While four high and low candidate frequencies are discussed, it is to be appreciated by one of ordinary skill in the art that more or less than four frequencies can be used and that the number of high candidate frequencies may be different than the number of low candidate frequencies.

Figure 14:
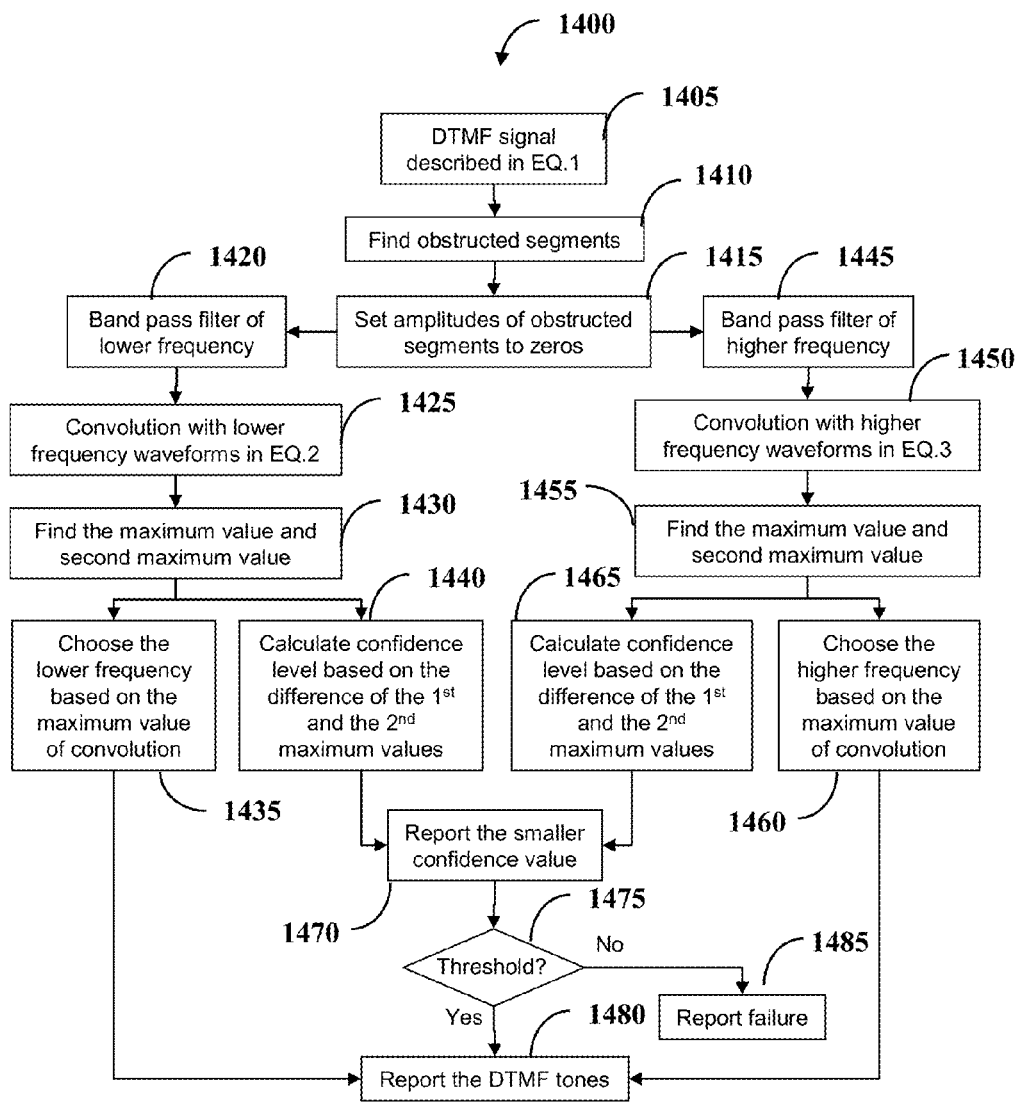
FIG. 14 illustrates one embodiment of a method that illustrates a decoding process can be employed in practicing at least one aspect disclosed herein.

FIG. 14 illustrates one embodiment of a method 1400 that illustrates a decoding process can be employed in practicing at least one aspect disclosed herein. The DTMF signal can be collected at 1405 and the obstructed segments are located from the data string x(t) at 1410 and the amplitudes of the obstructed segments are set to zeros 1415. Then, the lower and higher frequencies are estimated as discussed below.

With lower frequency estimation, the signal x(t) is band pass filtered at 1420 at the lower frequency bandwidth and proceeded for convolution calculations with four lower frequency waveforms at 1425. The maximum convolution value $y_{m1}^L$ and the second maximum convolution values $y_{m2}^L$ are calculated at 1430. The lower frequency waveform corresponding to the maximum convolution value is chosen to be the estimated lower frequency of the DTMF signal at 1435. The confidence of the lower frequency estimation is defined to be proportional to the difference of $y_{m1}^L$ and $y_{m2}^L$ as shown below $$k^L(y_{m1}^L - y_{m2}^L) \qquad (6)$$

where $k^L$ is the scale factor chosen by designer. At 1440 this confidence level is calculated.

With higher frequency estimation, the signal x(t) is band pass filtered at 1445 at the higher frequency bandwidth and processed for convolution calculations with four higher frequency waveforms at 1450. The maximum convolution value $y_{m1}^H$ and the second maximum convolution values $y_{m2}^H$ are calculated at 1455. The higher frequency waveform corresponding to the maximum convolution value is chosen at 1460 to be the estimated higher frequency of the DTMF signal. The confidence of the higher frequency estimation is defined to be proportional to the difference between $y_{m1}^H$ and $y_{m2}^H$ as shown below:

$$k^H(y_{m1}^H - y_{m2}^H) \qquad (7)$$

where $k^H$ is the scale factor chosen by the designer. At 1465 this confidence level is calculated.

The smaller value of the lower frequency estimation confidence and higher frequency estimation confidence is reported at 1470. That is, the confidence c can be obtained by $$c = \min(y_{m1}^L, y_{m1}^H) \qquad (8)$$

A threshold denoted by d can be used to define the success or failure of the frequency estimation that is checked at 1475. If c>d, the estimation of the lower frequency is declared to be successful and both the estimated lower frequency and the estimated higher frequency can be reported at 1480. Otherwise, a failure status is reported at 1485. The value d can be determined by a designer (e.g., person, intelligent computer system, etc.) based on the application requirements.

The method 1400 can be extended to N-number of multiple frequencies by defining the input signal as $$x(t) = \sum_{i=1}^{N} \alpha_i \cos(\omega_i t + \phi_i) \qquad (9)$$

and the convolution equation as $$y(t) = \frac{2}{\tau} \int_0^\tau x(\lambda)(\rho_j(t-\lambda)) \, d\lambda \qquad (10)$$

where $$\rho_j(t) = \cos(\omega_j t) \qquad (11)$$

Figure 15A:
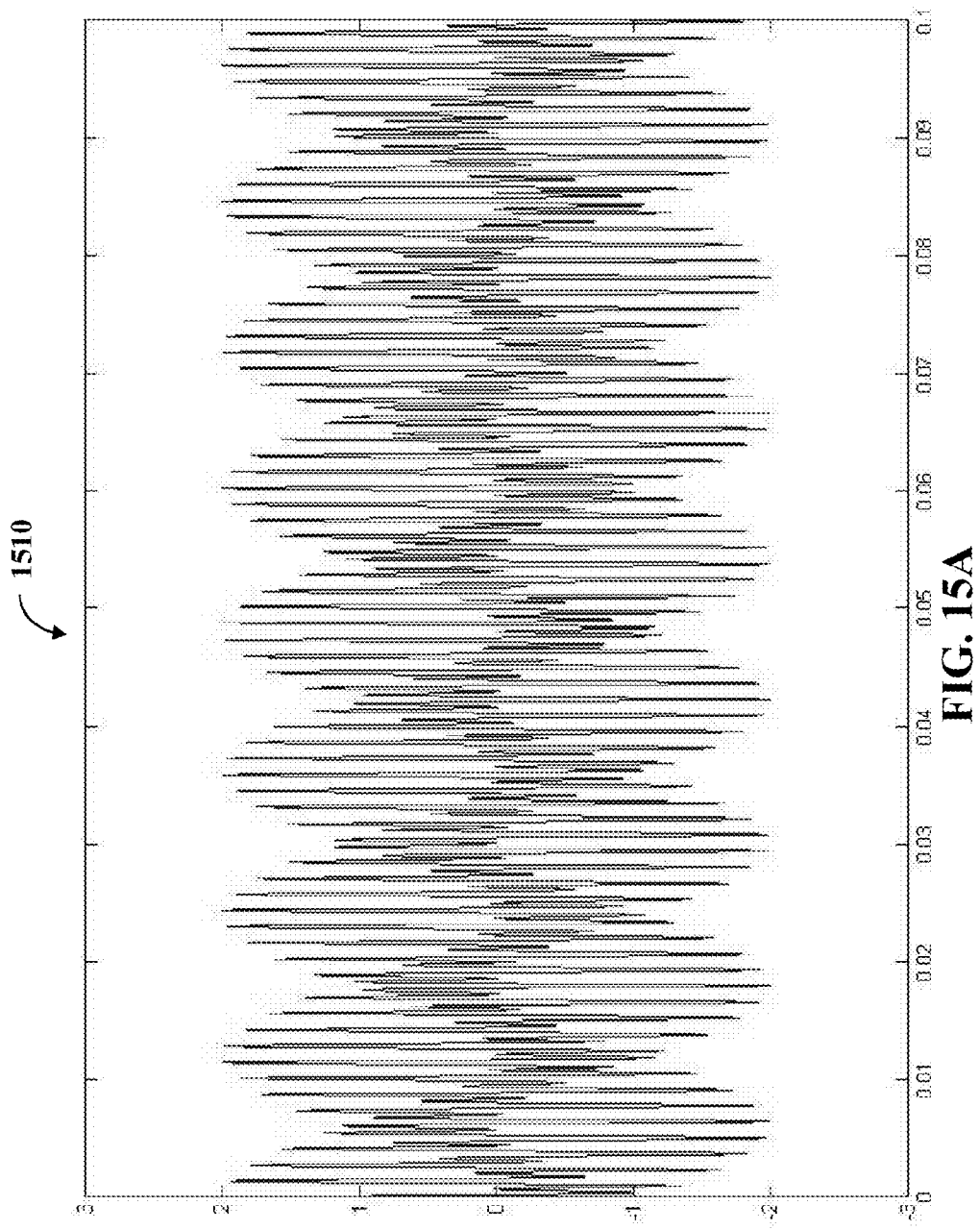
Figure 15B:
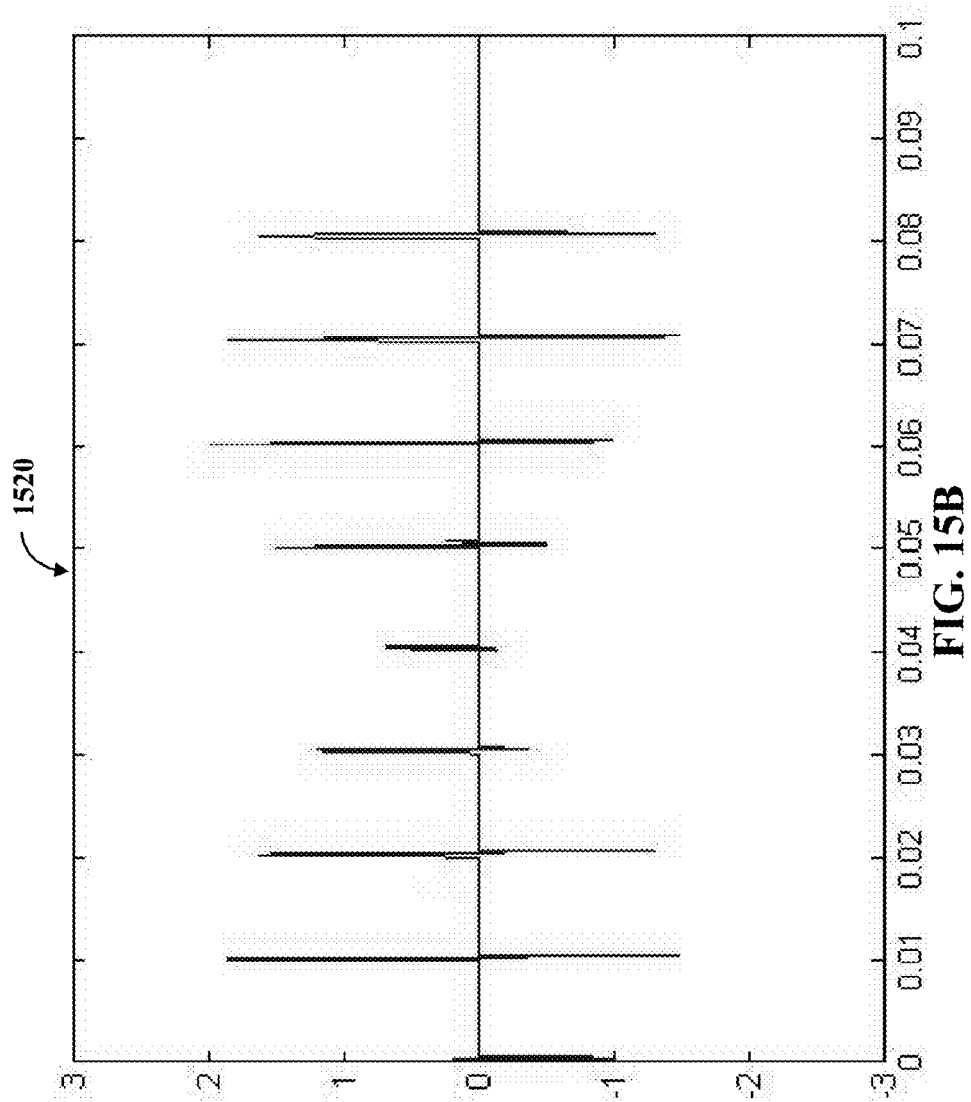
FIG. 15B illustrates one embodiment of a second graph of the signal.
Figure 16:
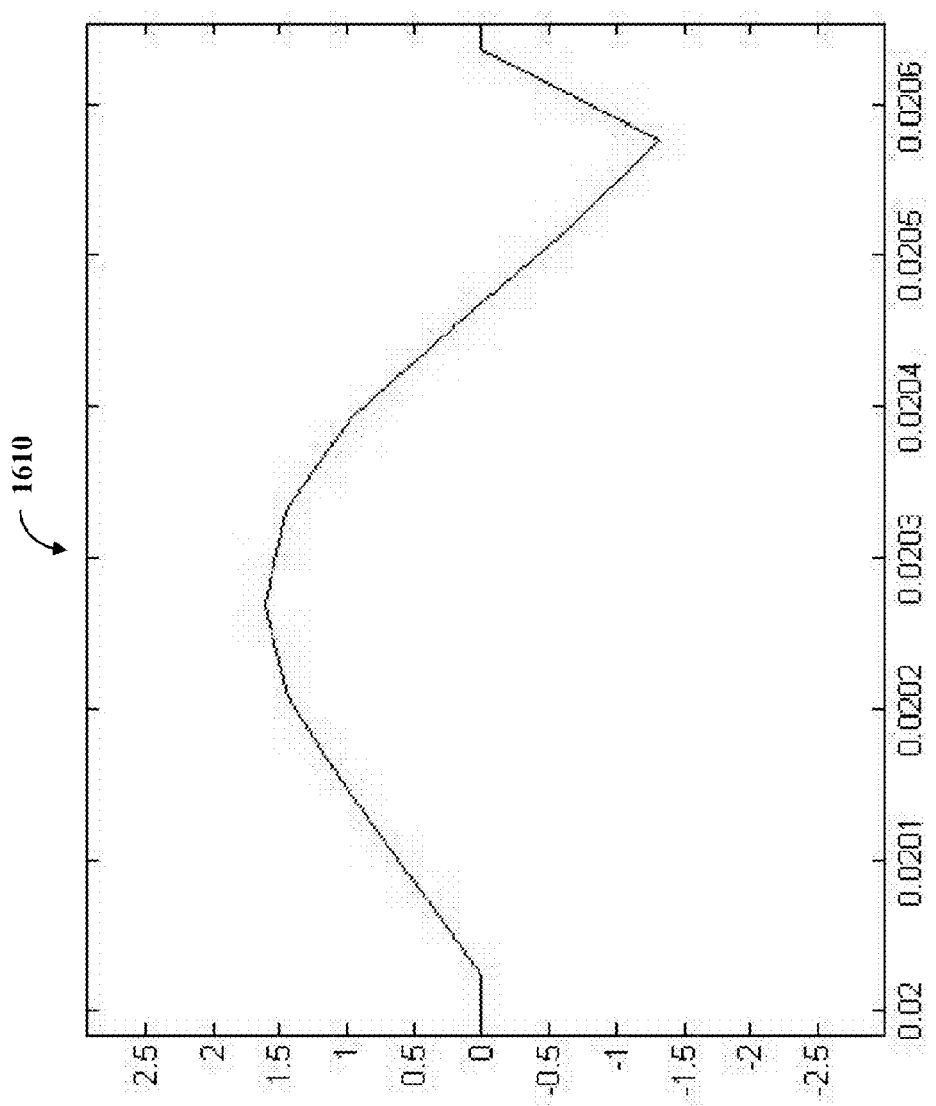
FIG. 16 illustrates one embodiment of a graph of a single signal segment.
Figure 17A:
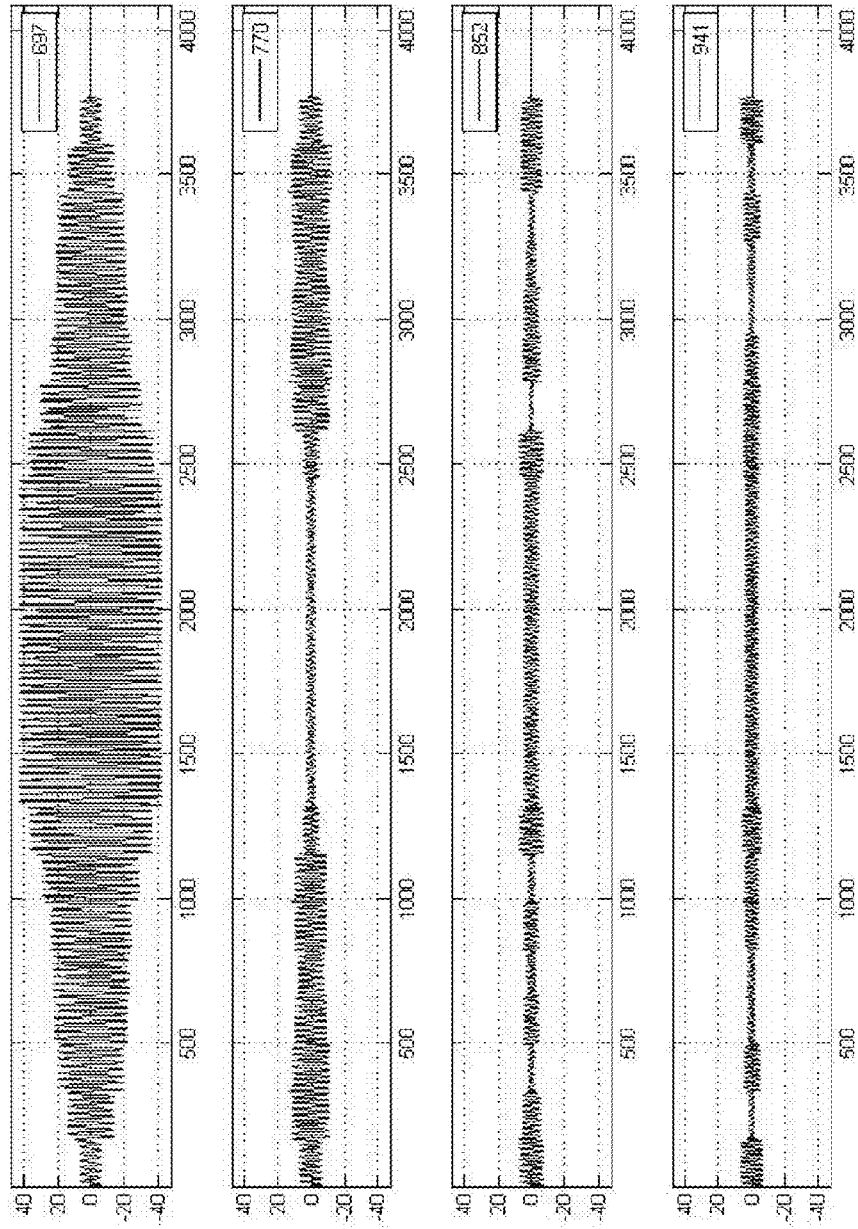
Figure 17B:
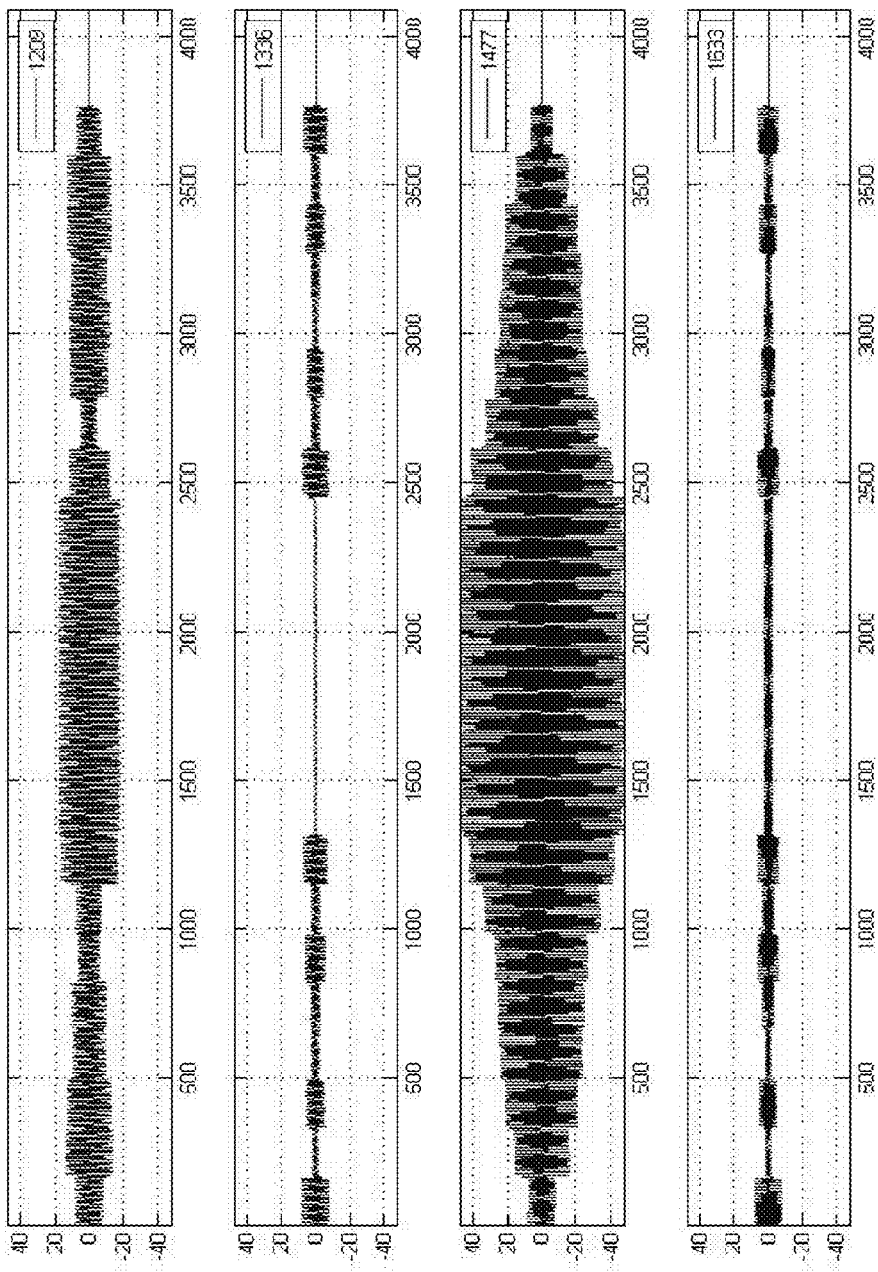
FIG. 17B illustrates one embodiment of a second processing result set.

FIG. 15A illustrates one embodiment of a first graph 1510 of a signal while FIG. 15B illustrates one embodiment of a second graph 1520 of the signal, FIG. 16 illustrates one embodiment of a graph 1610 of a single signal segment, and FIG. 17A illustrates one embodiment of a first processing result set 1710 while FIG. 17B illustrates one embodiment of a second processing result set 1720. An example of DTMF decoding is presented by choosing the DTMF key "3", which has the low frequency of 697 Hz and the higher frequency of 1477 Hz, can be described by:

$$x(t) = \cos(2\pi \cdot 697 \cdot t) + \cos(2\pi \cdot 1477 \cdot t) \qquad (12)$$

with t from 0 to 0.1 second as shown in the graph 1510. The signal can be is digitized with a sampling frequency of 16,330 Hz. The signal can be considered unobstructed in nine segments and the time interval of individual segments can be 0.5 millisecond, these unobstructed segments can be described by:

$$t_i \in \{10(i-1), 0.5 + 10(i-1)\} \text{ for } i=1, 2, \ldots, 9 \qquad (13)$$

and plotted in as illustrated in graph 1520 after setting the obstructed (e.g., corrupted) segments to zero amplitudes. The signal can be enlarged by plotting from 20 milliseconds to 20.5 milliseconds as shown in the graph 1610 and this shows that the frequencies of 697 Hz and 1477 Hz are not to be extracted from this segment since the full cycle of 697 Hz has a time interval of 1.4 milliseconds and the full cycle of 1477 Hz has a time interval of 0.677 milliseconds. Therefore, the 0.5 milliseconds signal segment is too short for statistical analysis.

In one example application of the method 1400 of FIG. 14, the convolution functions in EQ.2 and EQ.3 are chosen with τ=0.15 second. Aspects can be practiced with or without band pass filters. In this example, band pass filters are not used. The lower frequency convolution result set is illustrated in 1710 and shows that the maximum convolution value is corresponding to 697 Hz and the higher frequency convolution result set is illustrated at 1720 and shows that the maximum convolution value is corresponding to 1477 Hz. Therefore, 697 Hz is chosen as the lower frequency, 1477 Hz is chosen as the higher frequency, and the DTMF key "3" is decoded (e.g., through comparison with a look-up table). This example demonstrates that discontinued small segments can be utilized in recovering the missing information for detecting the frequencies and decoding the DTMF signal.

Aspects disclosed herein can be practiced in various applications. Example applications include detecting signals that are usually transmitted in a number of short, disjoint bursts, radar signals, extracting signaling information in cordless phones, non-message-oriented signaling of public switched telephone networks and so on.

What is claimed is:
1. A system, comprising:
  a high frequency identification component configured to identify a high frequency of a dual-tone multi-frequency signal;
  a low frequency identification component configured to identify a low frequency of the dual-tone multi-frequency signal;
  a classification component configured to determine a classification of the dual-tone multi-frequency signal based, at least in part, on the high frequency and a low frequency;
  a calculation component configured to calculate a confidence level of the classification;
  a comparison component configured to compare the confidence level against a threshold to produce a comparison result;
  an output component configured to:
    output the classification if the comparison result is such that the confidence level meets the threshold and
    output an error message if the comparison result is such that the confidence level does not meet the threshold; and
  a non-transitory computer-readable medium configured to retain an information set that pertains to operation of the high frequency identification component, the low frequency identification component, the classification component, the calculation component, the comparison component, the output component, or a combination thereof.

2. The system of claim 1, comprising:
a reception component configured to receive the dual-tone multi-frequency signal, where the dual-tone multi-frequency signal that is received has an obstructed portion and an unobstructed portion; and
a modification component configured to zero the obstructed portion, where the high frequency identification component is configured to identify the high frequency of the dual-tone multi-frequency signal through use of the unobstructed portion, and where the low frequency identification component is configured to identify the low frequency of the dual-tone multi-frequency signal through use of the unobstructed portion.

3. The system of claim 2, where the unobstructed portion comprises a first signal segment and a second signal segment and where the first signal segment and the second signal segment are discontinuous.

4. The system of claim 3, where content of the second signal segment is coherent to the content of the first signal segment.

5. The system of claim 1, where the classification corresponds to a character of a keypad.

6. The system of claim 1, where the dual-tone multi-frequency signal comprises a higher bandwidth and a lower bandwidth, where the high frequency identification component comprises a band pass filter at the higher bandwidth, and where the low frequency identification component comprises a band pass filter at the lower bandwidth.

7. The system of claim 1, comprising:
a normalization component configured to normalize the dual-tone multi-frequency signal, where the high frequency identification component and the low frequency identification component use the normalized version of the dual-tone multi-frequency signal to perform their identifications.

8. A non-transitory computer-readable medium configured to store processor-executable instructions that when executed by a processor cause the processor to perform a method, the method comprising:
recognizing a high frequency of a dual-tone multi-frequency signal;
recognizing a low frequency of the dual-tone multi-frequency signal;
concluding a classification of the dual-tone multi-frequency signal based, at least in part, on the high frequency and a low frequency;
attaining a confidence level of the classification;
correlating the confidence level against a standard to produce a result;
causing output of the classification when the result is such that the confidence level meets the threshold,
causing output of a fault communication when the result is such that the confidence level does not meet the standard, and
retaining an information set that relates to the concluding of the classification of the dual-tone multi-frequency signal.

9. The system of claim 8, the method comprising:
collecting the dual-tone multi-frequency signal, where the dual-tone multi-frequency signal that is received has an obstructed portion and an unobstructed portion;
zeroing the obstructed portion, where recognizing the high frequency of the dual-tone multi-frequency signal occurs through use of the unobstructed portion and where recognizing the low frequency of the dual-tone multi-frequency signal occurs through use of the unobstructed portion; and
normalizing the dual-tone multi-frequency signal, where recognizing the high frequency of the dual-tone multi-frequency signal occurs through use of the normalized version of the dual-tone multi-frequency signal and where recognizing the low frequency of the dual-tone multi-frequency signal occurs through use of the normalized version of the dual-tone multi-frequency signal.

10. The system of claim 9, where the unobstructed portion comprises a first signal segment and a second signal segment, where the first signal segment and the second signal segment are discontinuous, and where content of the second signal segment is coherent to the content of the first signal segment.

11. The system of claim 8, where the classification corresponds to a character of a keypad.

12. A system, comprising:
an identification component that identifies a high frequency and a low frequency of a dual-tone multi-frequency signal and identifies a low frequency of the dual-tone multi-frequency signal;
a classification component that determines a classification of the dual-tone multi-frequency signal based, at least in part, on the high frequency and a low frequency; and
a calculation component that calculates a confidence level of the classification;
a comparison component that compares the confidence level against a threshold to produce a comparison result; and
an output component that:
outputs the classification if the comparison result is such that the confidence level meets the threshold and
outputs something other than the classification if the comparison result is such that the confidence level does not meet the threshold,
where the identification component, the classification component, the calculation component, the comparison component, the output component, or a combination thereof is implemented, at least in part, through non-software.

13. The system of claim 12, comprising:
a reception component that receives the dual-tone multi-frequency signal, where the dual-tone multi-frequency signal that is received has an obstructed portion and an unobstructed portion, where the unobstructed portion comprises a first signal segment and a second signal segment, where content of the second signal segment is coherent to the content of the first signal segment, and where the first signal segment and the second signal segment are discontinuous;
a modification component that zeroes the obstructed portion, where the identification component identifies the high frequency of the dual-tone multi-frequency signal through use of the unobstructed portion and where the identification component identifies the low frequency of the dual-tone multi-frequency signal through use of the unobstructed portion; and
a normalization component that normalizes the dual-tone multi-frequency signal, where the identification component uses the normalized version of the dual-tone multi-frequency signal to perform the identifications.

14. The system of claim 12, where the classification corresponds to a character of a telephone number pad.

15. The system of claim 12, where the dual-tone multi-frequency signal comprises a higher bandwidth and a lower bandwidth, where the identification component comprises a band pass filter at the higher bandwidth that is employed in identification of the high frequency, and where the identification component comprises a band pass filter at the lower bandwidth that is employed in identification of the low frequency.

16. The system of claim 12, where the something other than the classification is a request sent to a transmitter of the dual-tone multi-frequency signal for the dual-tone multi-frequency signal to be resent.

17. The system of claim 12, where the identification component identifies the high frequency by ranking potential high frequency values by likelihood and selecting a highest ranking potential high frequency value as the high frequency and where the identification component identifies the low frequency by ranking potential low frequency values by likelihood and selecting a highest ranking likely potential low frequency value as the low frequency.

18. The system of claim 12, where the classification component determines the classification through use of a look-up table.

19. The system of claim 12, where the dual-tone multi-frequency signal comprises an obstructed portion and an unobstructed portion, where the unobstructed portion comprises a first signal segment and a second signal segment, where the first signal segment and the second signal segment are discontinuous, and where a content of the second signal segment is at partially repetitive of a content of the first signal segment.

20. The system of claim 12, where the identification component comprises an about 697 Hertz (Hz) filter, an about 770 Hz filter, an about 852 Hz filter, an about 941 Hz filter, an about 1209 Hz filter, an about 1336 Hz filter, an about 1477 Hz filter, and an about 1633 Hz filter.

* * * * *